US008521078B2

(12) United States Patent
Mittal et al.

(10) Patent No.: US 8,521,078 B2
(45) Date of Patent: Aug. 27, 2013

(54) COMMON INTERFACE PROTOCOL FOR SENDING FR-RDS MESSAGES IN WIRELESS COMMUNICATION SYSTEMS

(75) Inventors: Vineet Mittal, San Diego, CA (US); Rajeev Durai Rajan, San Diego, CA (US); Jatin Chandrakant Kadakia, San Diego, CA (US); Michal James Koenig, San Diego, CA (US); Thein Lee, San Diego, CA (US); Jason Miller, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 881 days.

(21) Appl. No.: 12/243,820

(22) Filed: Oct. 1, 2008

(65) Prior Publication Data

US 2009/0239557 A1    Sep. 24, 2009

Related U.S. Application Data

(60) Provisional application No. 61/038,724, filed on Mar. 21, 2008.

(51) Int. Cl.
*H04H 20/71* (2008.01)
*H04H 60/09* (2008.01)

(52) U.S. Cl.
USPC .............. 455/3.01; 455/3.06; 455/3.04

(58) Field of Classification Search
CPC .......... H04L 29/08; H04L 29/089; H04L 1/00
USPC ................ 455/3.01, 3.04, 3.06, 414.1, 66.1, 455/344
See application file for complete search history.

(56) References Cited

U.S. PATENT DOCUMENTS

| 5,564,073 | A | 10/1996 | Takahisa |
| 5,572,194 | A | 11/1996 | Shiota |
| 5,664,948 | A | 9/1997 | Dimitriadis et al. |

(Continued)

FOREIGN PATENT DOCUMENTS

| CN | 1213911 A | 4/1999 |
| CN | 1522018 A | 8/2004 |

(Continued)

OTHER PUBLICATIONS

International Search Report & Written Opinion—PCT/US2009/037892, International Search Authority—European Patent Office—Jul. 23, 2009.

*Primary Examiner* — Tilahun B Gesesse
(74) *Attorney, Agent, or Firm* — Abdollah Katbab

(57) ABSTRACT

Radio Data System (RDS) Interactive Services (IS) combines data feeds and interactivity with programs broadcast on FM channels. An RDS-IS client application on user equipment (e.g., handset) extracts RDS information from the RDS enabled FM receiver, and presents content on a mobile screen in a user-friendly format. Broadcasted RDS message can include special strings or "anchors" for special treatment by receivers. Receivers replace text with visuals to enhance user experience, such as cartoons or photographic icons based on names in RadioText fields. The RDS-IS client application generates specific prompts and composes interactive screens, enables hot keys and decides actions (e.g., voice calls, SMS) on key press, triggers contextual e-commerce by invoking data calls to given URLs, and sends statistics to the operator of a two-way data channel that provides enhanced content (e.g., CDMA reverse link, SMS, wireless access network, etc.) based upon "anchors" or "tags" included with the RDS-IS message.

60 Claims, 10 Drawing Sheets

(56) References Cited

U.S. PATENT DOCUMENTS

| | | | | |
|---|---|---|---|---|
| 5,708,478 | A | 1/1998 | Tognazzini | |
| 5,790,958 | A | 8/1998 | McCoy et al. | |
| 5,905,865 | A | 5/1999 | Palmer et al. | |
| 5,907,793 | A | 5/1999 | Reams | |
| 5,991,737 | A | 11/1999 | Chen | |
| 6,098,106 | A | 8/2000 | Philyaw et al. | |
| 6,240,280 | B1* | 5/2001 | Ravi et al. | 455/161.1 |
| 6,404,408 | B1 | 6/2002 | Emerson, III | |
| 6,411,800 | B1 | 6/2002 | Emerson, III | |
| 6,473,792 | B1 | 10/2002 | Yavitz et al. | |
| 6,539,212 | B1 | 3/2003 | Kamalski | |
| 6,628,928 | B1 | 9/2003 | Crosby et al. | |
| 6,658,232 | B1 | 12/2003 | Johnson | |
| 6,754,477 | B2 | 6/2004 | Kamalski | |
| 6,829,475 | B1 | 12/2004 | Lee et al. | |
| 6,957,041 | B2 | 10/2005 | Christensen et al. | |
| 6,975,835 | B1 | 12/2005 | Lake et al. | |
| 7,054,653 | B2 | 5/2006 | Jarvi et al. | |
| 7,107,029 | B2 | 9/2006 | Mason | |
| 7,158,753 | B2 | 1/2007 | Kagan et al. | |
| 7,315,726 | B2 | 1/2008 | Steelberg et al. | |
| 7,319,863 | B2 | 1/2008 | Engstrom et al. | |
| 7,340,249 | B2 | 3/2008 | Moran et al. | |
| 7,343,141 | B2* | 3/2008 | Ellis et al. | 455/132 |
| 7,359,944 | B2 | 4/2008 | An | |
| 7,623,824 | B2* | 11/2009 | Anttila et al. | 455/3.06 |
| 7,792,121 | B2* | 9/2010 | Thompson et al. | 370/395.4 |
| 7,917,130 | B1* | 3/2011 | Christensen et al. | 455/414.4 |
| 7,992,026 | B2* | 8/2011 | Eade et al. | 713/324 |
| 8,010,082 | B2* | 8/2011 | Sutaria et al. | 455/408 |
| 8,045,952 | B2* | 10/2011 | Qureshey et al. | 455/344 |
| 8,050,817 | B2* | 11/2011 | Moinzadeh et al. | 701/36 |
| 8,069,166 | B2* | 11/2011 | Alvarado et al. | 707/722 |
| 8,107,921 | B2* | 1/2012 | Fiatal | 455/405 |
| 8,166,164 | B1* | 4/2012 | Luna et al. | 709/224 |
| 8,176,028 | B2* | 5/2012 | Rodriguez | 707/706 |
| 8,190,701 | B2* | 5/2012 | Luna et al. | 709/213 |
| 8,204,953 | B2* | 6/2012 | Luna et al. | 709/213 |
| 8,239,327 | B2* | 8/2012 | Healy et al. | 705/51 |
| 8,291,076 | B2* | 10/2012 | Luna et al. | 709/224 |
| 8,296,195 | B2* | 10/2012 | Harb | 705/27.1 |
| 8,310,985 | B2* | 11/2012 | Harb | 370/328 |
| 8,316,098 | B2* | 11/2012 | Luna et al. | 709/216 |
| 8,326,486 | B2* | 12/2012 | Moinzadeh et al. | 701/36 |
| 8,326,985 | B2* | 12/2012 | Luna et al. | 709/224 |
| 8,356,080 | B2* | 1/2013 | Luna et al. | 709/216 |
| 8,391,155 | B2* | 3/2013 | Harb | 370/238 |
| 8,391,775 | B2* | 3/2013 | Moinzadeh et al. | 455/3.06 |
| 2004/0005900 | A1* | 1/2004 | Zilliacus | 455/466 |
| 2004/0131014 | A1* | 7/2004 | Thompson et al. | 370/230 |
| 2004/0198279 | A1* | 10/2004 | Anttila et al. | 455/179.1 |
| 2005/0181722 | A1 | 8/2005 | Kopra et al. | |
| 2006/0015908 | A1* | 1/2006 | Vermola et al. | 725/63 |
| 2006/0141961 | A1 | 6/2006 | Schentrup et al. | |
| 2006/0141962 | A1 | 6/2006 | Forbes et al. | |
| 2007/0016922 | A1* | 1/2007 | Koch | 725/35 |
| 2007/0155306 | A1 | 7/2007 | Koli et al. | |
| 2007/0155311 | A1 | 7/2007 | Christensen et al. | |
| 2007/0196802 | A1* | 8/2007 | Beletski et al. | 434/323 |
| 2007/0248055 | A1* | 10/2007 | Jain et al. | 370/331 |
| 2008/0070522 | A1 | 3/2008 | Marriott et al. | |
| 2008/0313697 | A1* | 12/2008 | Rajan et al. | 725/151 |
| 2009/0023406 | A1* | 1/2009 | Ellis et al. | 455/140 |
| 2009/0061763 | A1* | 3/2009 | Dillon et al. | 455/3.05 |
| 2009/0106800 | A1* | 4/2009 | Eade et al. | 725/56 |

FOREIGN PATENT DOCUMENTS

| | | |
|---|---|---|
| CN | 1647553 A | 7/2005 |
| CN | 1675930 A | 9/2005 |
| CN | 101129003 A | 2/2008 |
| JP | 11355229 | 12/1999 |
| JP | 2004509509 A | 3/2004 |
| JP | 2009534953 | 9/2009 |
| WO | WO02023773 | 3/2002 |
| WO | WO03090484 A1 | 10/2003 |

* cited by examiner

COMMON INTERFACE PROTOCOL FOR SENDING FR-RDS MESSAGES IN WIRELESS COMMUNICATION SYSTEMS

CLAIM OF PRIORITY UNDER 35 U.S.C. §119

The present Application for Patent claims priority to Provisional Application No. 61/038,724 entitled "COMMON INTERFACE PROTOCOL FOR SENDING FM-RDS MESSAGES IN WIRELESS COMMUNICATION SYSTEMS" filed Mar. 21, 2008 and assigned to the assignee hereof and hereby expressly incorporated by reference herein.

FIELD OF INVENTION

The described aspects relate generally to broadcast radio usage in a receiver. More particularly, the described aspects relate to embedded tags in radio broadcasts.

BACKGROUND

Broadcast radio stations, such FM radio stations, may use a system known as a Radio Data System (RDS) or Radio Broadcast Data System (RBDS in US), both referred to herein as "RDS," to transmit supplemental information corresponding to their normal radio programming, e.g., music, talk, news, etc. In particular, RDS is intended for application to FM sound broadcasts between 87.5 MHz to 108.0 MHz. For stereophonic broadcast, the RDS subcarrier is locked to third harmonic of the 19 KHz pilot tone with overall tolerance of ±6 Hz. For monophonic broadcast, the RDS subcarrier is 57 KHz±6 Hz. The data message rate is constrained to 1.1875 Kbits/sec as defined in standards for RBDS (i.e., NRSC-4-A, National Radio Systems Committee (NRSC) jointly sponsored by Consumer Electronics Association (CEA) and National Association of Broadcasters (NAB)) and for RDS (i.e., IEC/CENELEC EN:62106:2001, International Electrotechnical Commission (IEC) and European Committee for Electrotechnical Standardization (CENELEC)).

Broadcast radio stations transmit their programming and the supplemental information in the RDS format as distinct signals multiplexed onto a single carrier. Radio receivers having RDS decoders, such as those included with some wireless communications devices or those in a vehicle, permit a user to listen to the transmitted programming and view the corresponding supplemental information on a display. Specifically, generally-known RDS improves functionality for FM receivers by providing basic RDS information such as Program Identification, Program Service, and Automatic tuning as well as Open Data Application (ODA) for such services as traffic message channel, emergency warning systems, radio text, and enhanced radio paging, etc.

Attempts have been made to extend RDS beyond providing a standard protocol for several types of supplemental information transmitted by the broadcast radio stations, such as the identity of the particular radio station, the type of programming, and text information such as the name of an artist and/or song. For example, some specifications provide additional messages that can control portions of the supplemental information, such as the display of the radio text information. In another example, some services have been developed to provide content to the receiver using a data connection, where the content is synchronized with the radio programming via the data message.

SUMMARY

The following presents a simplified summary in order to provide a basic understanding of some disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with integrated services via a an RDS message encoded with an audio program, leveraging the wide reach of the FM broadcast. Interactivity for content to enhance the RDS information and user interaction are enabled across a number of radio access technologies and carriers.

In one aspect, a method utilizes Radio Data System (RDS) interactive services at a population of user devices by optimizing available RDS bandwidth while receiving related content via a two-way data channel. An interactive services client and a configuration component that identifies a request location accessible via a wireless communication channel provided by a wireless carrier of data packet services are incorporated. An analog radio signal is received containing audio portion and a tagged data message referencing available content that can be interpreted by the interactive services client. Delivery of requested available content is received via a two-way data channel via the wireless carrier.

In another aspect, at least one processor utilizes Radio Data System (RDS) interactive services at a population of user devices by optimizing available RDS bandwidth while receiving related content via a two-way data channel. A first module incorporates an interactive services client and a configuration component that identifies a request location accessible via a wireless communication channel provided by a wireless carrier of data packet services. A second module receives a Frequency Modulated (FM) radio signal containing audio portion and a tagged data message referencing available content that can be interpreted by the interactive services client. A third module receives delivery of requested available content via a two-way data channel via the wireless carrier.

In an additional aspect, a computer program product utilizes Radio Data System (RDS) interactive services at a population of user devices by optimizing available RDS bandwidth while receiving related content via a two-way data channel by having a computer-readable storage medium that comprises a first set of codes for causing a computer to incorporate an interactive services client and a configuration component that identifies a request location accessible via a wireless communication channel provided by a wireless carrier of data packet services. A second set of codes causes the computer to receive a Frequency Modulated (FM) radio signal containing audio portion and a tagged data message referencing available content that can be interpreted by the interactive services client. A third set of codes causing the computer to receive delivery of requested available content via a two-way data channel via the wireless carrier.

In another additional aspect, an apparatus utilizes Radio Data System (RDS) interactive services at a population of user devices by optimizing available RDS bandwidth while receiving related content via a two-way data channel. Means are provided for incorporating an interactive services client and a configuration component that identifies a request location accessible via a wireless communication channel provided by a wireless carrier of data packet services. Means are provided for receiving a Frequency Modulated (FM) radio signal containing audio portion and a tagged data message referencing available content that can be interpreted by the interactive services client. Means are provided for receiving delivery of requested available content via a two-way data channel via the wireless carrier.

In a further aspect, a user apparatus utilizes Radio Data System (RDS) interactive services at a population of user devices by optimizing available RDS bandwidth while receiving related content via a two-way data channel by comprising an interactive services client. A configuration component identifies a request location accessible via a wireless communication channel provided by a wireless carrier of data packet services. A Frequency Modulated (FM) receiver for receiving an FM radio signal containing audio portion and a tagged data message referencing available content that can be interpreted by the interactive services client. A wireless transceiver receives delivery of requested available content via a two-way data channel via the wireless carrier.

In yet one aspect, a method provides interactive services to a population of user devices by optimizing available intermittent data bandwidth accompanying an analog radio broadcast while delivering related content via a two-way data channel. A plurality of user devices are provisioned with an interactive services client and a configuration component that identifies a request location accessible via a wireless communication channel provided by a wireless carrier of data packet services. An analog radio signal is broadcast containing audio portion and a tagged data message referencing available content that can be interpreted by the interactive services client. Delivery of the available content requested by a selected one of the plurality of user devices is facilitated via a two-way data channel via the wireless carrier.

In yet another aspect, at least one processor provides Radio Data System (RDS) interactive services to a population of user devices by optimizing available RDS bandwidth while delivering related content via a two-way data channel. A first module provisions a plurality of user devices with an interactive services client and a configuration component that identifies a request location accessible via a wireless communication channel provided by a wireless carrier of data packet services. A second module broadcasts an analog radio signal containing audio portion and a tagged data message referencing available content that can be interpreted by the interactive services client. A third module facilitates delivery of the available content requested by a selected one of the plurality of user devices via a two-way data channel via the wireless carrier.

In yet an additional aspect, a computer program product provides Radio Data System (RDS) interactive services to a population of user devices by optimizing available RDS bandwidth while delivering related content via a two-way data channel comprising of a computer-readable storage medium having a first set of codes for causing a computer to provision a plurality of user devices with an interactive services client and a configuration component that identifies a request location accessible via a wireless communication channel provided by a wireless carrier of data packet services. A second set of codes causes the computer to broadcast an analog radio signal containing audio portion and a tagged data message referencing available content that can be interpreted by the interactive services client. A third set of codes causes the computer to facilitate delivery of the available content requested by a selected one of the plurality of user devices via a two-way data channel via the wireless carrier.

In yet another additional aspect, an apparatus provides Radio Data System (RDS) interactive services to a population of user devices by optimizing available RDS bandwidth while delivering related content via a two-way data channel. Means are provided for provisioning a plurality of user devices with an interactive services client and a configuration component that identifies a request location accessible via a wireless communication channel provided by a wireless carrier of data packet services. Means are provided for broadcasting an analog radio signal containing audio portion and a tagged data message referencing available content that can be interpreted by the interactive services client on the receiving device. Means are provided for facilitating delivery of the available content requested by a selected one of the plurality of user devices via a two-way data channel via the wireless carrier.

In yet a further aspect, a network apparatus provides Radio Data System (RDS) interactive services to a population of user devices by optimizing available RDS bandwidth while delivering related content via a two-way data channel. An RDS distribution component provisions a plurality of user devices with an interactive services client and a configuration component that identifies a request location accessible via a wireless communication channel provided by a wireless carrier of data packet services. An analog radio broadcaster broadcasts an FM radio signal containing audio portion and a tagged data message referencing available content that can be interpreted by the interactive services client. A data packet network facilitates delivery of the available content requested by a selected one of the plurality of user devices via a two-way data channel via the wireless carrier.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
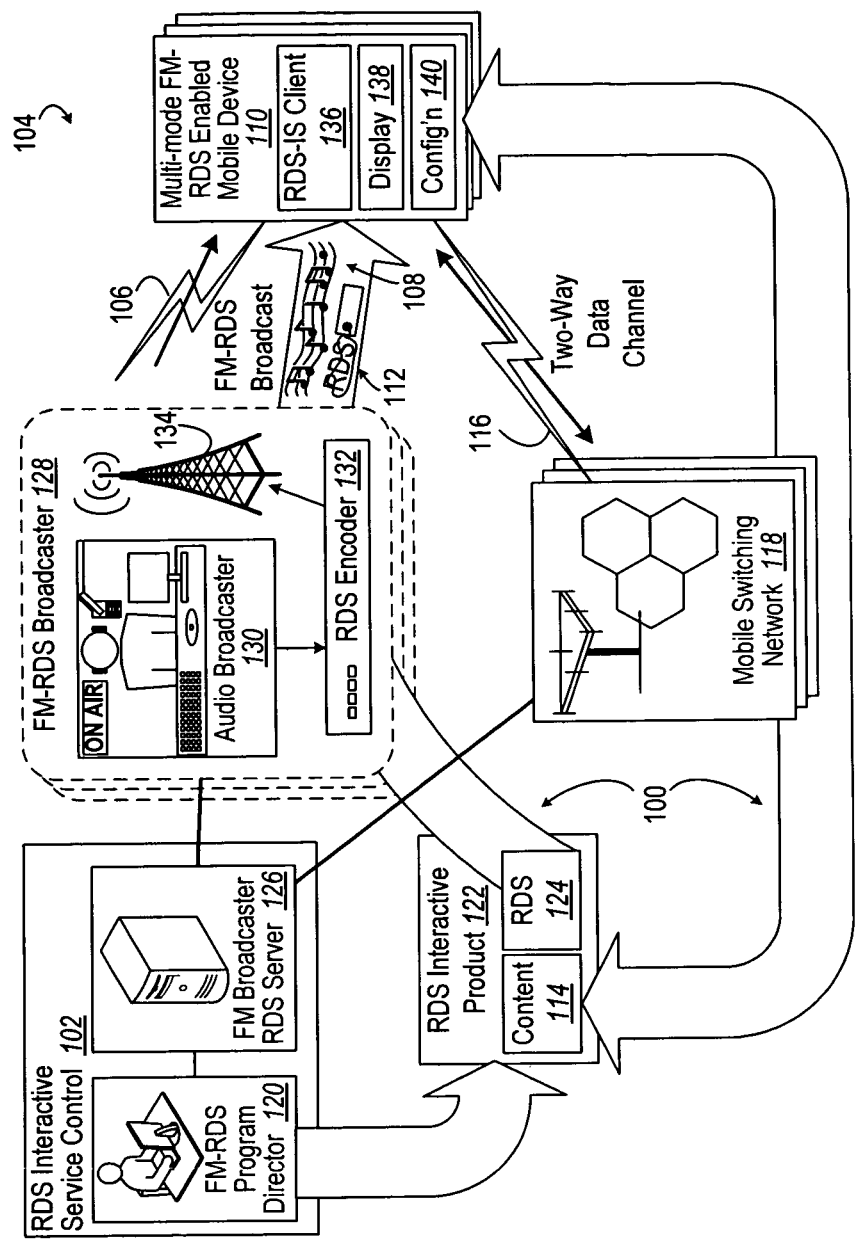
FIG. 1 illustrates a block diagram of a Radio Data System (RDS) Interactive Service (IS) provided over a hybrid communication system of a one-way Frequency Modulation (FM) radio broadcast and a two-way data communication channel.

A Radio Data System Interactive Services (RDS-IS) client on a user device interprets tagging information within an RDS message received on an FM broadcast and presents an option to a user via a user interface. Upon an initiating event (e.g., existing setting, user selection, etc.), the client utilizes a stored configuration file for an initial location appropriate for an operator of the two data communication channel, which in turn facilitates retrieval of the selected content promoted by the RDS message. Thereby, multiple mobile operators can simultaneously provide RDS-IS on the same RDS broadcast channel with the two-way data channel having operator specific encryption. The broad reach but constrained data throughput of FM-RDS is complimented by the conversely provisioned two-way data channels to access a packet data network for data intensive operations such as audio/video clip download, etc. Moreover, RDS-IS can be related to audio content of the FM broadcast for synergistic results, such as selling ringtones that are promoted by the full song. Examples of other interactive services include user interface (UI) wallpaper downloads, voting/contests, customer service (e.g., navigation, alerts, news). The RDS-IS client application generates specific prompts and composes interactive screens (e.g., ringtone/wallpaper icon related to the currently playing song, etc.), enables hot keys and decides actions (e.g., voice calls, SMS) on key press, triggers contextual e-commerce by invoking data calls to given URLs, and sends statistics to the operator of a two-way data channel that provides enhanced content (e.g., CDMA reverse link, SMS, wireless access network, etc.) based upon "anchors" or "tags" included with the RDS-IS message. The device can incorporate separately secured graphics and content to enhance the communication value of the RDS-IS message to compensate for the limited data throughput. An RDS-IS message can trigger alerts (e.g., audible, visual, tactile) to get the user's attention. User selections support analytical functions such as usage data collection and whether the user opts in or out of RDS-IS. For instance, levels of RDS-IS participation can be dictated by device limitations and user selections (e.g., display data message only, limited interaction, interaction at a certain priority relative to operator services or device performance, etc.). Particular features of mobile devices can be supported such as "hot keys" so that the user can send SMS (Short Message Service), call a # (make a voice call), etc. just on a single-click/key-press, to enable the mobile device interactions with advertisements.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, a Radio Data System (RDS) Interactive Service (IS) 100 managed at an RDS-IS Control 102 is delivered over a hybrid communication system 104 that enhances the reach and program content of one-way radio broadcasts with interactivity provided by a separate data channel. In particular, a one-way Frequency Modulated (FM) RDS-IS broadcast 106 provides audible program content (e.g., music, talk, news, etc.) 108 that can be received by a wide number of FM radio receivers (not shown), some of which interpret standard RDS text embedded within the broadcast for text displays. Advantageously, a population of the receivers is RDS-IS Enabled Devices 110, many of which can be mobile, that can also interpret tagged RDS messages 112 that advertise an opportunity for interaction with additional content 114. This content 114 is requested and received through a two-way data channel 116, which can be provided multiple operators, depicted as Mobile Switching Networks 118.

It should be appreciated with the benefit of the present disclosure that aspects herein apply generally to an intermittent data signal added to a broadcast of an analog audio radio signals. In particular, such broadcasts used in conjunction with a two-way data channel to deliver interactive content responsive to tagged messages in the intermittent data signal. In an exemplary aspect, the intermittent data signal conforms generally with protocols for RDS or RBDS and the analog audio radio signal conforms to frequency modulation (FM) protocol. This two-way data channel 116 can be intermittently available with limited coverage areas, available at varying subscription rates that affect what RDS interactive services are proposed to the user, and can entail different communication protocol including encryption, as well as being different radio access technologies (e.g., wireless access network, 3G air interface, personal access network, etc.). However, the two-way data channel 116 can have sufficient data throughput for receiving content 116 such as digital audio, video, songs, ringtones, graphical user interface (GUI) wallpaper, interactive games and contest content, user navigation information, and local alert information, etc.

The RDS-IS Control 102 is depicted as having an RM-RDS Program Director 120 that defines an RDS Interactive Product 122 having an RDS component 124 and identifying the content 114. The RDS interactive Product 122 is stored and disseminated by an FM broadcaster RDS server 126 to one or more FM-RDS broadcasters 128, depicted as having an audio content generator 130 that is combined with the tagged RDS messages 112 by an RDS encoder 132 for transmission by a radio broadcast transmitter 134.

The multi-mode FM-RDS enabled mobile device 110 has an RDS-IS client 136 that interprets the tagged RDS messages 112, displaying them on a display 138 as appropriate for the device 110, user settings, and subscription capabilities provided by the available mobile switching network 118. Upon an initiating event, such as a pre-existing user setting or a user input, the client 136 pursues the selected content 114 by referencing a configuration file 140 provisioned on the mobile device 110. The configuration file 140 provides an initial request location suitable for the operator/carrier that supports data packet services to the particular mobile device 110. The mobile switching network 118 can then facilitate receipt of the requested content 114.

As an example of user settings, various levels of user profile can be supported such as the following: (1) Dynamically adjust to the user level as prescribed by the network in real time in conjunction with the device capabilities; (2) Receive and display RDS data only, no interactions using packet data services (voice and SMS interactions permitted); (3) Receive and display RDS data only, minimum interaction using packet data services to enhance the RDS data display; (4) Receive and display RDS data, Interactivity using packet data services at low priority; (5) Receive and display RDS data, Interactivity using packet data services at medium priority; (6) Receive and display RDS data, Interactivity using packet data services at high priority; and (7) Other.

Figure 2:
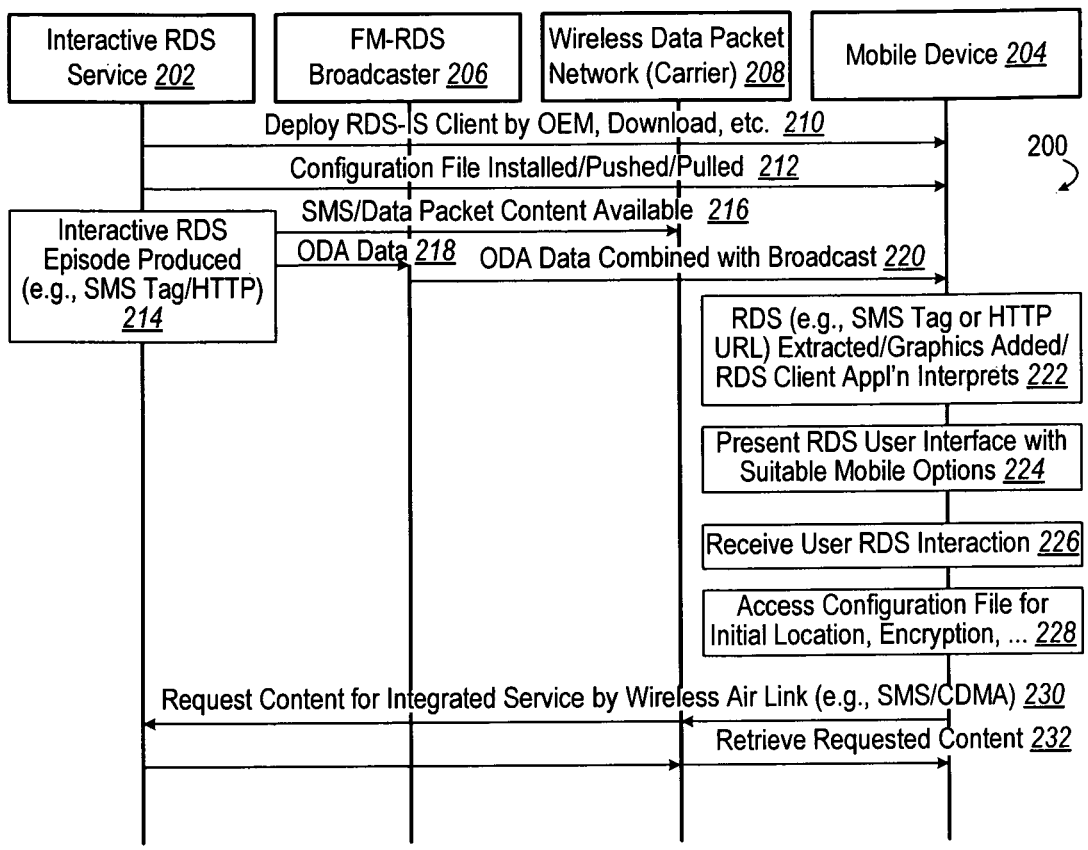
FIG. 2 illustrates a flow diagram of a methodology for RDS interactive services to a mobile device.

FIG. 2 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

In FIG. 2, a methodology 200 provide an alert from Interactive RDS Service 202 using an RDS-IS message to an RDS-enabled user device 204, which in the illustrative aspect is mobile, via a one-way FM-RDS broadcaster 206 of available content that can be retrieved over another over-the-air, two-way data communication channel depicted as a Wireless Data Packet Network (Carrier) 208 that has greater data throughput. The two-way communication channel can alternatively be a Short Message System (SMS) or other types of over-the-air delivery.

As depicted at 210, the Interactive RDS Service 202 deploys an RDS interactive service as an RDS-IS client application to the mobile device 206. This deployment can comprise distribution to an original equipment manufacturer that installs the client before fielding. Alternatively or in addition, the client application can be an over-the-air download facilitated by the carrier 208. Alternatively or in addition, the client application can be locally installed by a user, retail shop personal, distributor, etc.

Similarly, as depicted at 212, a configuration component (e.g., file) deployed to the mobile device 206, which can be an original installation, a pushed file or a pulled file. The configuration file can inform the RDS-IS client application to particular configuration items such as how to interact with the carrier 208 in order to obtain RDS interactive services.

As depicted at 214, the interactive RDS service 202 produces an RDS episode that includes an "anchor" or "tag" on how to augment the RDS text and how to retrieve interactive services based upon pre-existing settings for the mobile device 204 or based upon user interactions with the mobile device 204 responsive to the presented RDS text (e.g., alphanumeric display, graphical display, audible display, haptic feedback, etc.) The interactive RDS service 202 identifies where this additional content can be obtained at 216, which can entail provisioning the mobile device 206 in advance, verifying a location for pre-existing content (e.g., uniform resource locator (URL)), or causing the content to be stored at an accessible location. The tagged RDS episode includes a tagged RDS message, depicted as Open Data Application (ODA) data at 218, that is distributed to the FM-RDS broadcaster 206, which in turn encodes the tagged RDS message with the audio content and broadcasts the resulting FM signal to the mobile device 204 as depicted at 220.

As depicted at 222, the mobile device 204 interprets the tagged RDS message, which can include a location of available content. Some content can be automatically retrieved either locally or via the carrier 208 to enhance the presentation of the RDS text (e.g., artistic cartoon, photographic icon, alert sound, etc.). The mobile device 204 also presents a suitable RDS user interface (block 224). For example, the client application can determine the hardware/software constraints of the mobile device (e.g., types of user controls, available communication paths (e.g., SMS, voice call, wireless application protocol (WAP) browser, etc.), subscription constraints imposed by the carrier 208, user settings, etc.

As depicted at 226, the client application determines user interaction with a presented RDS prompt. This interaction can be a pre-existing user input to automatically retrieve certain types of content. Alternatively, the user interaction can be a user input to the mobile device 204 interactively directly with the presented RDS prompt. In answer to the user selection, the client application refers to information in the configuration file specific to how to access the associated content via the carrier 208 (block 228). As depicted at 230, the mobile device 204 requests the associated content as identified by the interactive RDS service 202 via the carrier 208, which in turn returns the content as depicted at 232.

Figure 3:
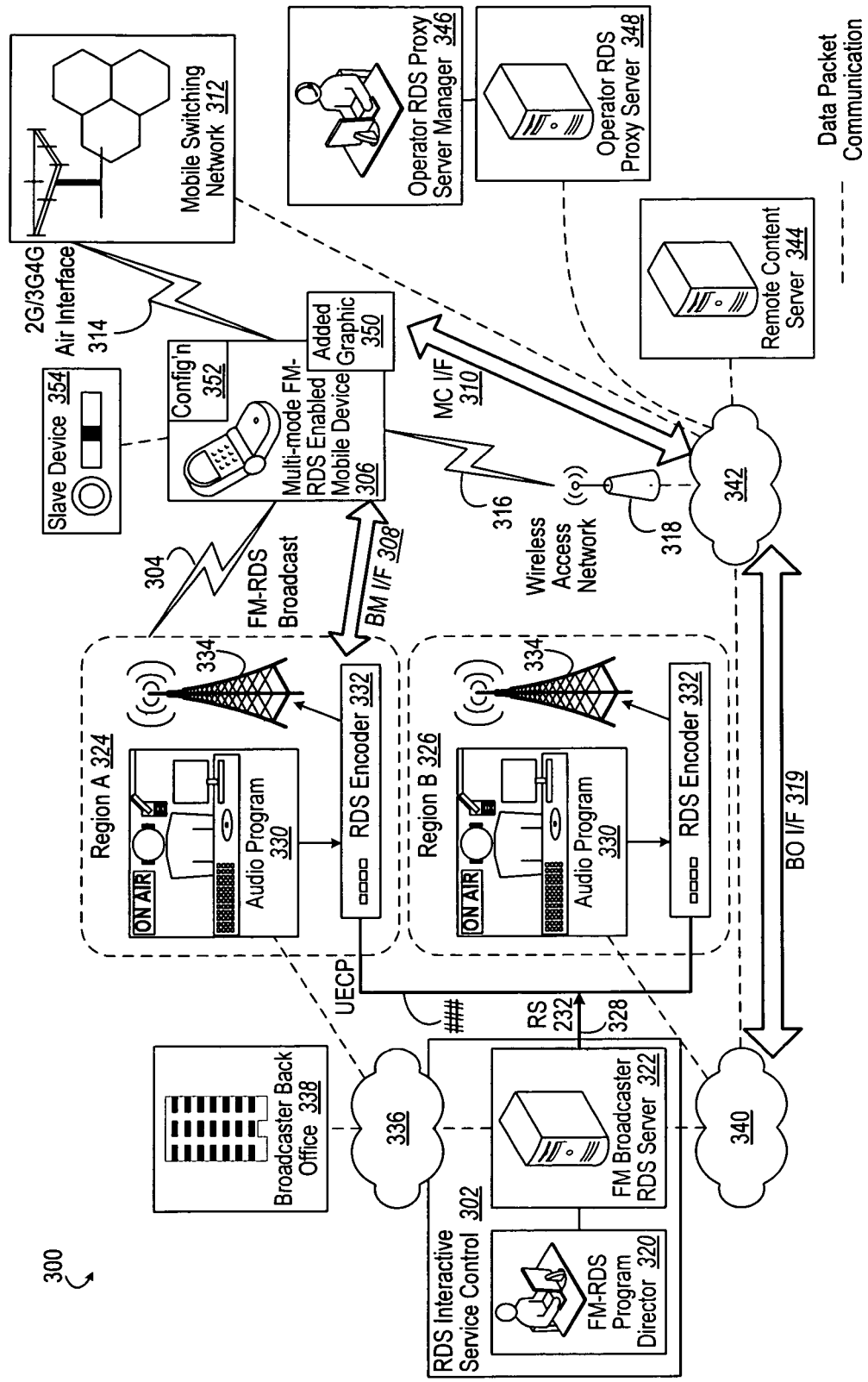
FIG. 3 illustrates a block diagram of an RDS interactive service provided across a plurality of FM-RDS broadcasters and a plurality of carriers of two-way data channels.

In FIG. 3, in another aspect Radio Data System (RDS) Interactive Service (IS) network 300 managed at an RDS-IS Control 302 is delivered over a hybrid communication system 304 that enhances the reach and program content of one-way radio broadcasts with interactivity provided by a separate data channel. In one aspect, optimal performance can be achieved by reducing RDS data for broadcast while utilizing packet data network and interconnections between elements of two networks effectively. In particular, a one-way FM RDS-IS broadcast 304 provides audible program content (e.g., music, talk, news, etc.) that can be received by a wide number of FM radio receivers (not shown), some of which interpret standard RDS text embedded within the broadcast for text displays. Advantageously, a population of the receivers is RDS-IS enabled mobile devices 306 that can also interpret tagged RDS messages using a Broadcaster-Mobile (BM) interface 308 that advertise an opportunity for interaction with additional content. The BM interface 308 enhances the existing RDS protocols to support interactive voice and data services in the FM-RDS enabled mobiles 306. This BM interface 308 is supported by utilizing newly created Open Data Applications (ODAs). By the very nature of FM-RDS transmission, this interface is unidirectional from FM-RDS broadcaster to receiving mobiles. The receiving mobile requires a client application to interpret the ODA data received for presentation to the user and facilitate interactivity with the mobile network. In order to support reception from multiple broadcasters by the same client application, in one aspect each broadcaster is assigned a unique application ID (AID). Alternatively or in addition, a separate AID can be assigned to each broadcaster and operator relationship.

This content is requested and received through a two-way data channel provided by a Mobile-Carrier (MC) interface 310, which can be provided by multiple operators of different radio access technologies depicted as a Mobile Switching Networks 312 accessed via a 2G/3G/4G Over-the-Air (OTA) link 314 and a Wireless Access Network (WAN) coverage area 316 of a base node (e.g., access point) 318. The two-way data channel is completed by a Broadcaster-Operator (BO) interface 319. For clarity, the network interactivity sought by the mobile device 306 is referred hereafter as mobile switching network 312, which may be any private or public wireless communications network operating according to any known standard, including Code Division Multiple Access (CDMA), cdmaOne, cdma2000, Universal Mobile Telecommunication System (UMTS), Wideband CDMA, Global System for Mobile Communications (GSM), and TIA/EIA-136.

The RDS-IS Control 302 is depicted as having an RM-RDS Program Director terminal (PDT) 320 that defines an RDS interactive product stored and disseminated by an FM broadcaster server RDS 322 to one or more FM-RDS broadcasters for Regions A and B 324, 326 via an interface 328, annotated as an RS-232 interface and a Universal Encoder Communication Protocol (UECP). Other illustrative formats include TCP/IP, RS232C and RS-485.

Program director terminal(s) 320 thus can manage RDS feeds to the broadcast, can synchronize RDS with live audio in real time, can authorize and accept RDS broadcast data requests from a mobile switching network 312, can inform an operator's mobile switching network 312 of current and future broadcasts. The RDS broadcast servers 322 can feed RDS to encoders in the network 300, configure encoders, can monitor encoders, and can communication with partner operator FM-RDS server (s), PDTs, and broadcast network back office.

In particular, each FM-RDS broadcaster 324, 326 is depicted having an audio content generator (broadcast studio) 330 that is combined with the tagged RDS messages 312 by an RDS encoder 332 for transmission by a radio broadcast transmitter 334. In an illustrative aspect, such encoders 332 are available from vendors such as Audemat-Aztec, Via radio, and ProFM Solutions. For national or multi-region FM broadcasters 324, 326, the RDS-IS network 300 likely consists of multiple sites with multiple RDS encoders 332 as depicted, such that the broadcast RDS server(s) 322 to address each encoder 332 in the FM broadcaster network 324, 326 separately.

Each of the BM interface 308, MC interface 310, and BO interface 319 can include a public or private network (e.g., Internet) or other communication links such a Publicly Switched Telephone Network (PSTN), depicted as a network 336 between the broadcaster RDS server 322 and a broadcaster back office system 338, a network 340 between the broadcaster RDS server 322 and the BO interface 319, a network 342 between the BO interface 319 and the base node 318 and mobile switching network 312. Also depicted are distributed functions for carrier operations and content storage for two-way data interaction. A remote content server 344 communicates with network 342. An operator RDS proxy server 346, managed by an operator RDS proxy server manager 348, also communicates with the network 342. Thus, these remotely accessible components are also part of the RDS-IS network 300.

Real time synchronization of audio broadcast and corresponding RDS enhances mobile user experience and effective network interactivity. In support of this objective, an FM broadcaster back office system 338, program director terminal 320 or FM broadcaster 324, 326 can prepare RDS data for preprogrammed broadcast (e.g., continuous uninterrupted for a duration). The FM broadcaster 324, 326 can also insert RDS in live broadcasts such as breaking news, talk shows, sporting events, etc. In an illustrative aspect, mobile driven RDS broadcasts do not interfere with non-mobile FM receivers such as car radios, portable FM receivers, etc. The broadcaster back office system 338 can develop and distribute an Electronic Preview Guide (EPG) to broadcast stations and program director terminal (PDT) 320.

The RDS-enabled mobile device 306 can be a mobile device that enhances the user experience by drawing upon added graphics 350 locally stored or available remotely. A configuration file 352 provisioned on the mobile device 306 can provide the necessary authentications and communication protocols to access such content from a carrier 312, 318. It should be appreciated with the benefit of the present disclosure that mobile devices 306 can be various types of user equipment or access terminals (e.g., converged handheld computer, smart phone, portable media player, wireless-capable handheld game console, personal digital assistant, and a laptop, etc.). Alternatively to being a user device focused on user interaction, aspects consistent with the disclosure herein can be used in a fixed position device or a component integral or in communication with an apparatus, depicted a slave device 354.

Consider a routine daily broadcast scenario supported by the network 300. With regard to EPG distribution, the FM Broadcaster back office system 338 downloads EPG files to broadcast RDS server 322, program director terminal 320, and broadcast studio 324, 326, and mobile switching network 312. An illustrative EPG file is preformatted and may contain the following information: (a) region and encoders involved (one, group, or all); (b) daily schedule with segments; (c) segment time (start and end); (d) default RDS (RT, RT+ tags, etc.) for each segment (talk show, sport commentaries, etc.) for various user profiles; (e) RDS for tracks, title, audio source, etc. to be broadcast during the segment for various user profiles; (f) repetition and group sequence changes, if any; (g) pertinent information to forward to the mobile operator (e.g., broadcast RDS server 322 forwards truncated or full information to mobile operator network); (h) segment properties (e.g., allow PDT changes, allow network changes, authorization level needed, etc.); (i) network loading threshold settings for broadcast for predefined times.

The broadcast studio 330 generates audio as per EPG for the segment. The broadcast RDS server 322 configures encoders 332 in the involved region and begins to generate RDS (UECP messages) to encoders in synchronization with audio broadcast. The broadcast RDS server 322 instructs the mobile switching network 312 of segment start and pertinent information (optional or if different than previous distribution). The broadcast RDS server 322 can instruct the program director terminal(s) 320 of segment start and pertinent information, especially if different than previous distribution. The broadcast RDS server 322 can modify RDS data based on network load. For example, time based RDS usage distribution for different group types can be predicted or reported back (e.g. high usage traffic data during rush hour, high interactivity data during low voice traffic periods, etc.). In one aspect, the mobile switching network 312 assesses the network loading in real time and notifies the broadcast RDS server 322, which in turn instructs the FM-RDS interactive services client applications in active mobile devices 306 through subsequent RDS broadcast to manage the network load.

For instance, the following illustrates a change made by the program director terminal 320 in response to an operator 312 request. During the segment broadcast, a request is received from operator 312 to the effect that network 300 is to broadcast new RDS data. The broadcast requests from operator network 312 is received in the broadcast RDS server 322, which in turn determines if the request shall be honored or sent for authorization based on service level agreement (SLA). Example of such requests include to make a change in a network loading threshold, to broadcast vote tallies, to broadcast commands for usage data collections, etc. Authorization may be obtained from the program director. The new EPG is then made to honor the request, assuming approved.

Tuned in mobile devices 306 receive the audio and corresponding RDS. Mobile switching network 312 prepares for the anticipated interactivity (e.g., preload shopping content) data. The responsible program director terminal 320 monitors the synchronization of RDS with the actual audio and makes corrections as needed. the process can be repeated for the next segment With regard to client application and network interactivity, the client application of the mobile device 306 decodes received RDS and based on the current user profile and network mode threshold, derives the interactivity level for the user. If packet data interactivity is not allowed, then RDS data is presented in non-interactive mode. If packet data interactivity is allowed, then based on received RDS data in an illustrative aspect the mobile device 306 identifies the RDS proxy server 346 (e.g., from Server Control Bits (SCB) contained in the RDS message and template or application configuration). The mobile device 306 establishes packet data session. The mobile device 306 provides current user profile, device profile, network mode threshold, received template, RDS data, etc., to the server 348. The proxy server 348 determines pertinent content types available (e.g., ringtones, wallpapers, audio, etc.) and actions from the data received and returns to application for presentation to user. The client application presents the received information to the user and awaits user action. The mobile device 306 allows user to select the content type (e.g., preview and download (ringtones, wallpaper, titles, etc.), URL, Call number) and request the network 300 for processing. The network 300 ensures that the user can be properly billed for the action and download the content. The client application presents the received information to the user and stores in the appropriate content folder.

Figure 4:
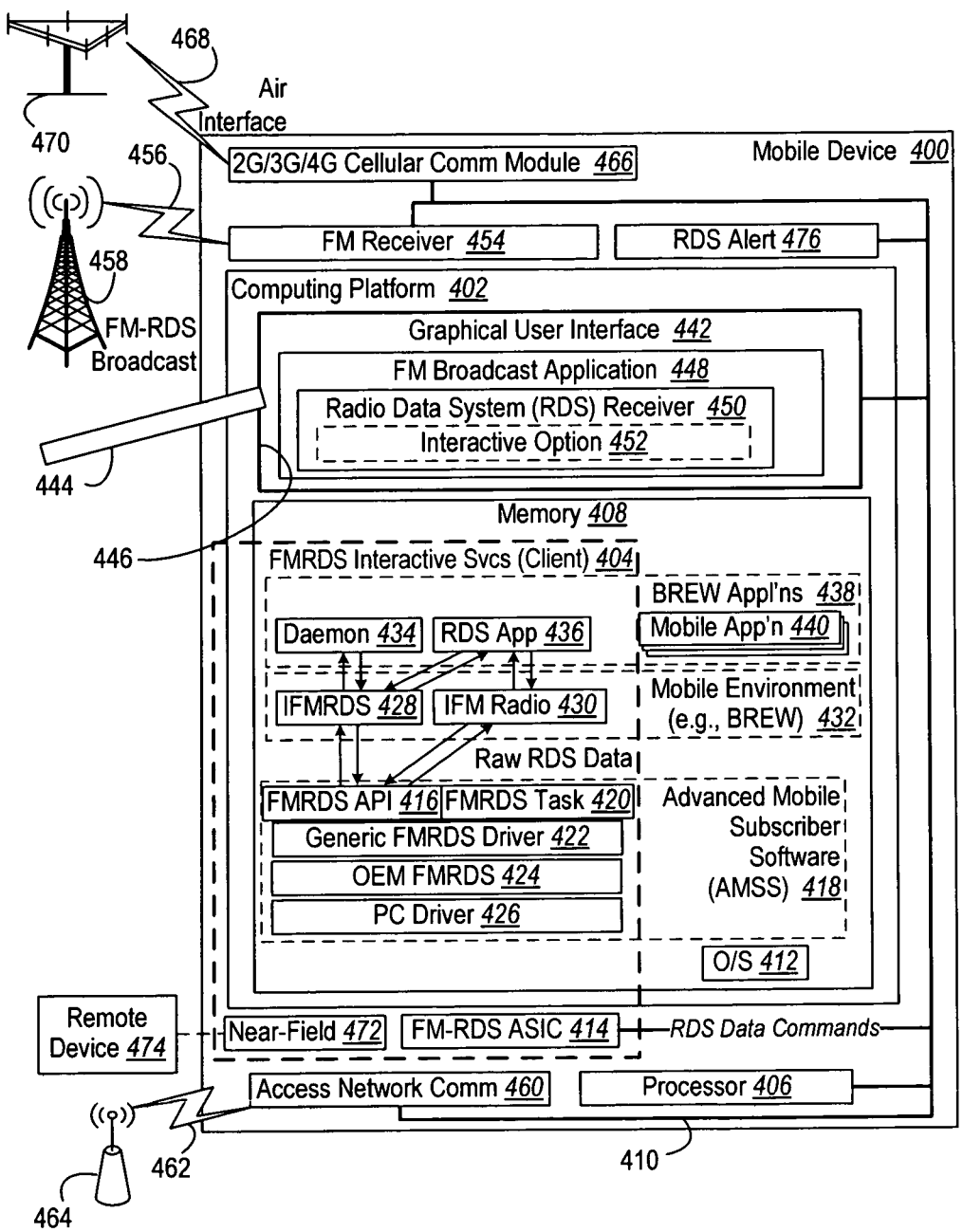
FIG. 4 illustrates a schematic block diagram of a mobile communication device enabled to receive RDS interactive services.

In FIG. 4, an illustrative mobile device 400 advantageously has a computing platform 402 that executes a client application ("FM-RDS Interactive Services") 404. The computer platform 402 comprises a processor 406 and the memory 408 communicating over a data bus 410. Processor 406 controls the operation of the mobile device 400 according to an operating system (O/S) 412, applications or programs or modules stored in memory 408. The control functions may be implemented, for example, in a single microprocessor, or in multiple microprocessors. Suitable microprocessors may include general purpose and special purpose microprocessors, state machines, as well as digital signal processors. Further, for example, processor 406 may be an application-specific integrated circuit (ASIC), or other chipset, logic circuit, or other data processing device. In an illustrative depiction, an FM-RDS ASIC 414 handles RDS data commands for the processor 406 conveyed via the data bus 410.

Memory 408 represents all of the memory associated with mobile device 400, and may include both random access memory (RAM) and read-only memory (ROM), erasable ROM (EPROM), electronically erasable ROM (EEPROM), flash cards, or any memory common to computer platforms. Further, memory 408 may include one or more flash memory cells, or may be any secondary or tertiary storage device, such as magnetic media, optical media, tape, or soft or hard disk. For example, computer program instructions and data utilized in the operation of mobile device 400 may be stored in non-volatile memory, such as EPROM, EEPROM, and/or flash memory. Additionally, memory 408 may be implemented as discrete devices, stacked devices, or may be integrated with processor 406. Memory 408 can also include areas partitioned into and designated for use as temporary memory buffers.

Processor 406 or other data processing device such as ASIC can execute an application programming interface (API) layer that interfaces with any resident applications, and/or programs and/or modules, such as an FMRDS API 416, stored in memory 408, which resides within an advanced mobile subscriber software (AMSS) 418 that also includes a stack of an FMRDS task 420, generic FMRDS driver 422, an OEM FMRDS component 424, and a PC driver 426.

In an illustrative aspect, raw RDS data is exchanged between the FMRDS API 416 and an IFMRDS component 428 and an IFM Radio 430 component residing in a mobile environment 432 (e.g., BREW™ (Binary Runtime Environment for Wireless), an application development platform created by Qualcomm Corporation, San Diego, Calif.), which in turn interact with a daemon 434 and RDS-IS client application 436 executing in a BREW application layer 438 along with other mobile applications 440.

In the exemplary aspect, an integral graphical user interface (GUI) 442 with an input device, depicted as touch screen stylus 444, and an output device, depicted as display 446, allows the user to interact with an FM application rendering 448 that presents RDS receiver display 450 that can have an interactive option 452 for RDS interactive services. For example, an input device 444 can comprise a mechanism such as a key, keypad and/or keyboard, a mouse, a touch-screen display, a microphone, etc. In certain aspects, an output device 446 may include or comprise an audio speaker, display, a haptic feedback mechanism, etc.

It should be appreciated with the benefit of the present disclosure that the mobile device 400 contains at least one communication component capable of receiving a unidirectional FM broadcast as well as an interactive data channel. In some applications, two or more discrete communication subsystems can provide RF and protocol capabilities for receiving or transceiving certain communication types. In the illustrative depiction, an FM receiver 454 receives an FM-RDS broadcast signal 456 from an FM-RDS broadcaster 458. A wireless access network communication module (e.g., 802.11) 460 can receive data packet communication 462 with a base node (access point) 464. Alternatively or in addition, network interactivity can be achieved via a 2G/3G/4G cellular communication module 466 that forms an air interface 468 with a mobile switching network 470.

Certain functions can be distributed or remote to the mobile device 400, as depicted by a near-field transceiver 472 that controls a remote device 474.

An RDS alert component 476 can augment the accentuations and output capabilities of the GUI 440, such a flashing light, vibration, audible signal, etc., in order to alert a user that an interactive service is being offered via RDS.

Figure 5:
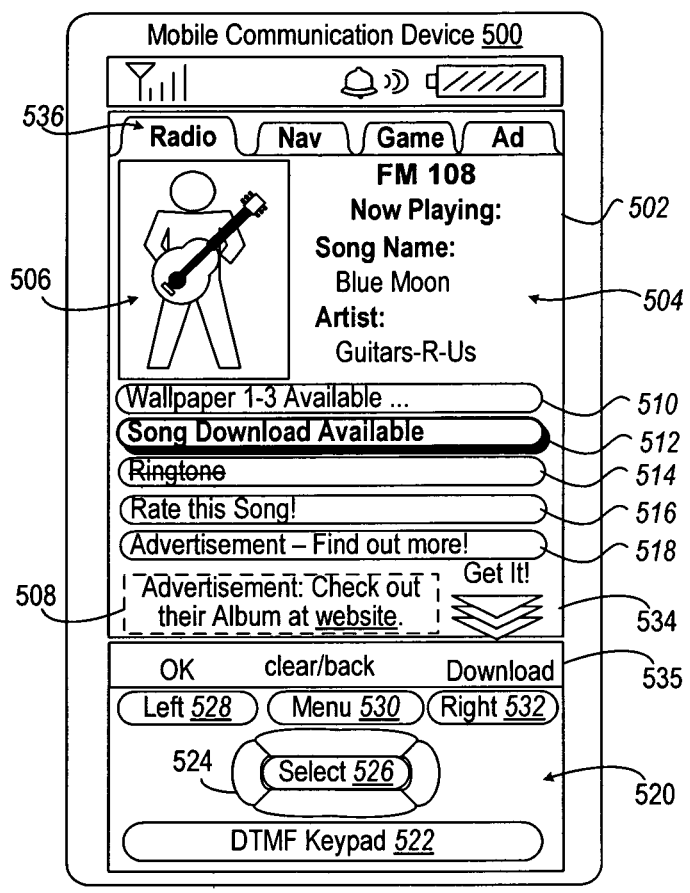
FIG. 5 illustrates a diagram of a mobile communication device presenting an RDS prompt about a shopping opportunity related to audio program content.

In FIG. 5, in another aspect, a mobile communication device 500 is presenting RDS interactive services on a GUI 502 related to shopping for downloadable content related to a current playing audio program. RDS data display 504 can provide a station identifier, song name and artist derived from the RDS message, which is advantageously captured and presented with headers. The GUI 502 has also accessed a graphic 506 either from local data cache or from network interaction pertaining to the current audio. This graphic 506 can be a generic icon or picture that is associated with some information in the RDS message.

The RDS interactive services can include automatically presenting an advertisement 508 related to audio program or that is unrelated.

User options that are made available for RDS interactive services are depicted as a selectable item 510 for wallpaper, selectable item 512 for downloading the song currently being played, selectable item 514 for ringtones is disabled to reflect the nonavailability of this option, although unavailable items can be omitted entirely. A selectable option 516 enables rating the current audio program. A selectable option 518 requests additional information about the currently displayed advertisement 508.

The RDS-IS client can adapt the GUI depiction to accommodate limitations of the device 500. For example, input controls 520 are depicted as dial tone multiple frequency (DTMF) keypad 522, cursor buttons 524 and select button 526, and left, center, and right programmable menu buttons 528, 530, 532. For instance, use of the cursor buttons 524 can highlight the song download available (selectable option 512), which can be executed by depressing right programmable menu button 532 in response to instructions 534 to activate a corresponding programmable option "download" depicted at 535.

Other RDS interactive services can be dynamically indicated and selected, as suggested by a radio tab 536 that has been scrolled to or otherwise made a top window in the GUI 502.

Figure 6:
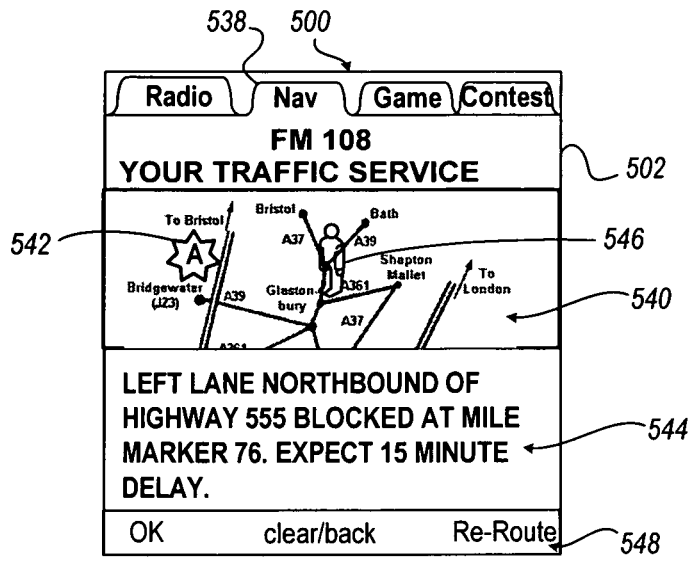
FIG. 6 illustrates a diagram of a mobile communication device presenting an RDS prompt about a geographic navigation opportunity.

In FIG. 6, a Navigation (Nav) tab 538 has been selected or automatically presented according to some RDS command. A combination of data in the RDS message, locally cached data, and remotely accessed data is put together in response to the RDS message to give navigation guidance. This is depicted as a moving map display 540 with a flagged area of interest 542 and a text advisory "LEFT LANE NORTHBOUND OF HIGHWAY 555 BLOCKED AT MILE MARKER 76. EXPECT 15 DELAY" depicted at 544. Advantageously, the RDS-IS client is capable of approximating the position of the mobile communication device 500 as depicted at 546. The RDS-IS client has also reprogrammed user interaction options as depicted at 548 to include "Re-route" to seek additional interactive services. Such an implementation can be collaboration between a navigation guidance system and an FM-RDS-IS system to provide time critical navigation updates that are geographically targeted.

Figure 7:
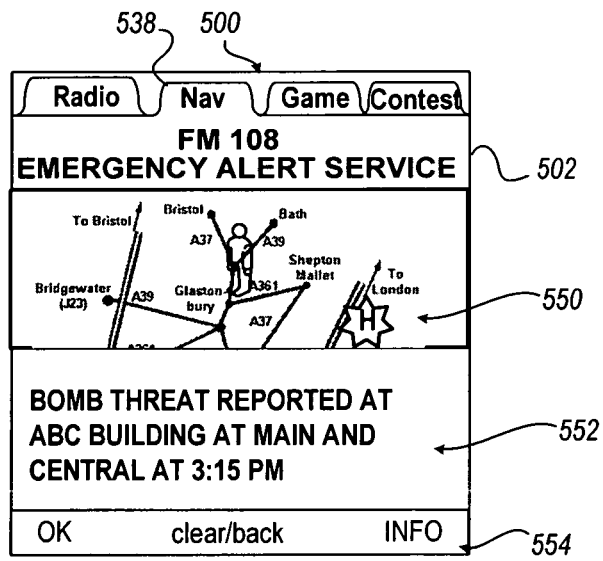
FIG. 7 illustrates a diagram of a mobile communication device presenting an RDS prompt about a geographically positioned emergency alert.

In FIG. 7, the GUI 502 of the mobile communication device 500 has received an emergency alert, which can illustrate an automatic function of RDS-IS that is presented to the user. A similar map depiction 550 is given with a text warning 552 "BOMB THREAT REPORTED AT ABC BUILDING AT MAIN AND CENTRAL AT 3:15 PM" with a reprogrammed user interaction option depicted at 554 for more "Info".

To give an illustrative scenario for supporting the depictions of FIGS. 6-7, the RDS-IS can respond to breaking news when the broadcast station interrupts regular programming and begins to broadcast the news. The broadcast station can instruct the program director to alter the RDS interactive services to correspond to the breaking news. The program director evaluates the available contents (video clips, images, taped audio, etc.), reconstructs the EPG (or overrides the existing EPG with a new one) and instructs broadcast RDS servers to begin broadcasting the revised RDS message. The program director via the broadcast RDS server instructs the mobile switching network of the event and proxy server prepares the available contents for use by listeners. When regular programming is returned, the program director time offsets the original EPG to synchronize with the broadcast. The client application in listener's mobile device detects the RDS change and performs new interactivity to present available content types.

Figure 8:
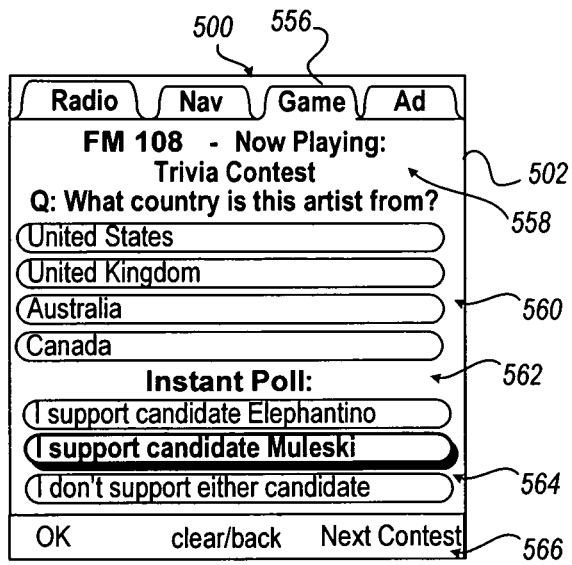
FIG. 8 illustrates a diagram of a mobile communication device presenting an RDS prompt about a voting contest and a polling opportunity.

In FIG. 8, a game tab 556 has been selected presenting a trivia content as depicted at 558 to enhance interest in the audio program. To reduce data bandwidth required by the RDS-IS messages, questions could be taken from a standard list of questions triggered by a short code and looked up in cached memory, such as "what country is this artist from?" The possible answers could also be triggered by abbreviated codes to present multiple possible responses, in this case "United States", "United Kingdom", "Australia", and "Canada" as depicted at 560. Alternatively or in addition, a voting application can be presented as depicted at 562, which in this case gives possible responses to a vote between two candidates as depicted at 564. The RDS-IS client has presented reprogrammed option "Next Contest" at 566 to get a new page.

Figure 9:
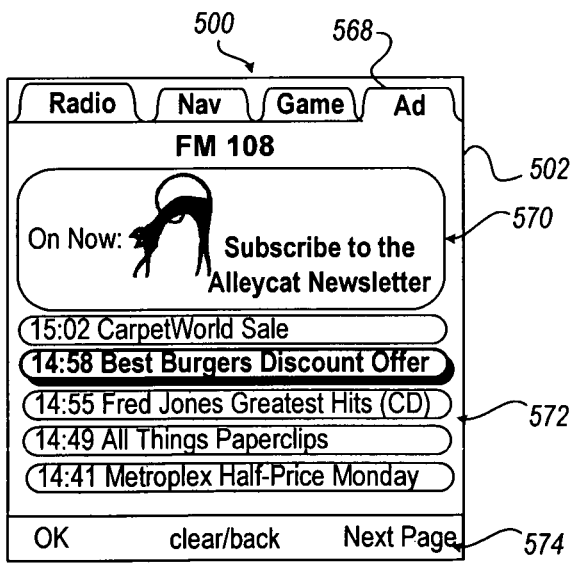
FIG. 9 illustrates a diagram of a mobile communication device presenting a historical listing of RDS prompts.

In FIG. 9, an advertisement/history tab 568 has been selected, which includes a locally-augmented depiction of an RDS advertisement 570 currently presented in synchronization with audio program with a time-tagged history of previously presented advertisements depicted at 572 selectable by cursor and select key (not shown) with additional items retrievable with a "next page" option 574.

Figure 10:
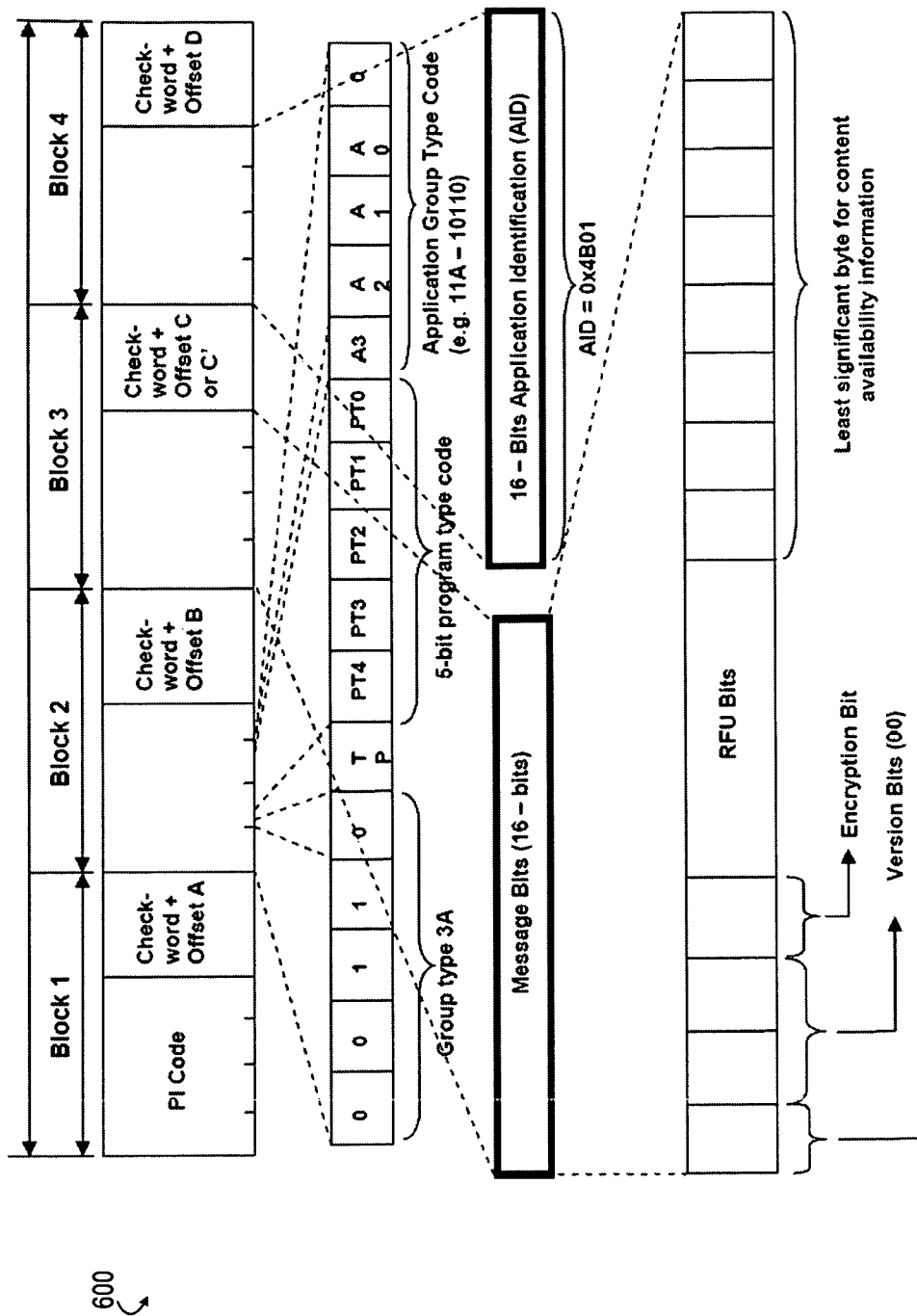
FIG. 10 illustrates a block diagram of an RDS-IS message format.

In FIG. 10, an illustrative tagged RDS message data structure 600 enhances the RDS/RBDS standards with a Group type 3A that conveys the mobile Open Data Application (ODA) group type information as well as the Application ID (AID) to the mobile client application. In addition, the data structure 600 also carries operator specific information in 16 message bits available in block 3. The toggling of the most significant bit (MSB-Bit 15) indicates that a different ODA data frame is being broadcast. Bits 14 and 13 identify the version of the BM interface being broadcast, which allows support of up to four versions from the reference version. As the current version of BM interface is 0 in the illustrative aspect, these bits can have value 00. Bit 12 is set to "0" if ODA message frames are not encrypted and "1" if encrypted. Bits 8-11 are currently reserved. The least significant byte (bits 7-0) is available for operator specific information, for example indicating availability of content for download. In particular, the bits can indicate whether wallpaper is available, whether ringtone is available, whether color ring back tone is available, whether an alert is appropriate or not, and whether the user can rate the item.

The application identifier (AID) can be unique for each mobile operator and broadcaster relationship or common AID between a broadcaster and multiple mobile operators.

Each content information ODA group can be defined to have a PI Code of 16 bits, a group type field of 5 bits, a TP flag field of 1 bit, a program type code field of 5 bits, a message frame segment number field of 5 bits, a CRC (cyclic redundancy code) field of 8 bits in the first segment, a message frame length field of 8 bits for the first segment, and a message frame data for the segment specified field, which is advantageously dynamically used in increments of 8, 16, 24 or 32 bits if last segment and 8 or 16 bits if the first segment.

Figure 11:
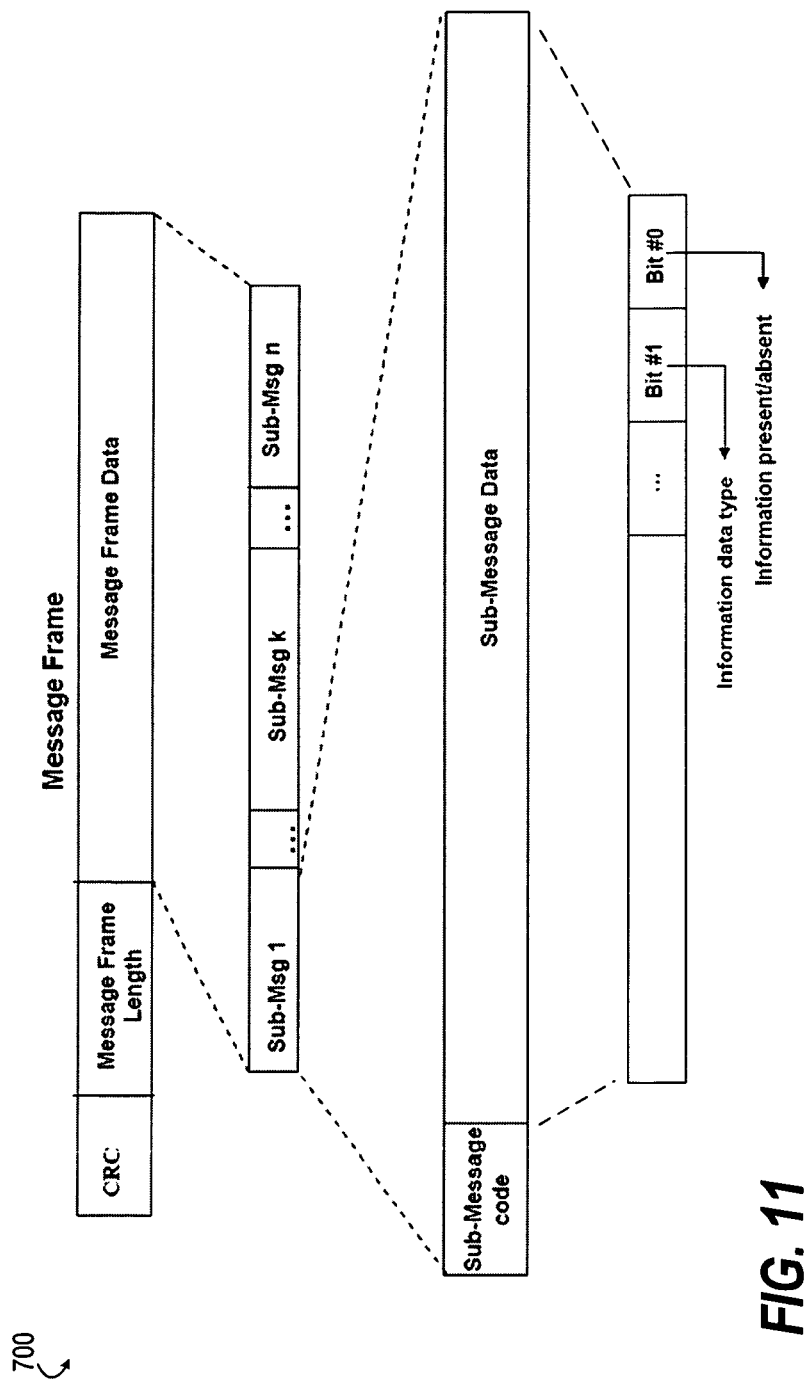
FIG. 11 illustrates a block diagram of a Broadcaster-Mobile (BM) interface ODA Message Frame format.

In FIG. 11, a data structure 700 is depicted for a BM interface ODA message frame format. An ODA message frame consists of 8-bit CRC followed by Message Frame Length (MFL) followed by one or more messages. At transmission, the message frame is divided in appropriate number of segments where each segment consists of four (4) bytes of message frame data, except the first segment that can only have two bytes of message frame data. Depending upon the size of the message, the last segment may consist of 1 to 4 bytes of message frame data. First byte of segment 0 represents the CRC and second byte represents the message frame length in bytes. This allows the client application to detect the start of message and number of segments and bytes expected in the message frame data. Together with AID, ODA message frame allows establishment of a relationship between broadcaster and client application.

The CRC eliminates interpretation of erroneous message frame resulting from receipt of ODA data from more than one broadcast station especially in overlapping regions. Both the message frame length and message frame data can be included in calculation of the CRC.

A sub-message data may consist of various information parameters which may or may not be present in a sub-message. In addition, the parameter may be of different data types (e.g. DSI, Character string, etc.). In order for mobile application to detect presence and data type of each parameter, an exemplary information bit pattern is specified as the least significant bit (LSB) of the information pair bits corresponds to the presence or absence of the parameter. If this bit is set to 1, then the parameter (information field) is present. Else, parameter is absent. The most significant bit (MSB) of information pair bits corresponds to the data type of the parameter, which can be either DynamicSizedInt (i.e., dynamic sized integer) (if 0) or NullTerminatedString (if set to 1). The above pattern continues left to right until all the information pair bits are specified for all possible parameters in the sub-message. Thereby, this dynamic sized integer mechanism allows backward software compatibility when parameter list is expanded in subsequent versions since older versions of the client application will simply ignore the new parameters.

In one aspect, types of sub-messages can include two types based on the presence of parameter information bits: Static Sub-Messages are the messages that have all of the fields mandatory. These sub-messages do not require parameter information bits and as a result, cannot be extended or enhanced in the future. Broadcaster information sub-message is a type of static sub-message. Dynamic sub-messages are the sub-messages whose content is dependent upon a parameter information bits field. It is possible to expand these messages by introducing new parameters without having adverse effect on previous software revisions. Contest sub-messages, vote sub-messages, promotion sub-messages, etc., are the examples of the dynamic sub-messages.

Figure 12:
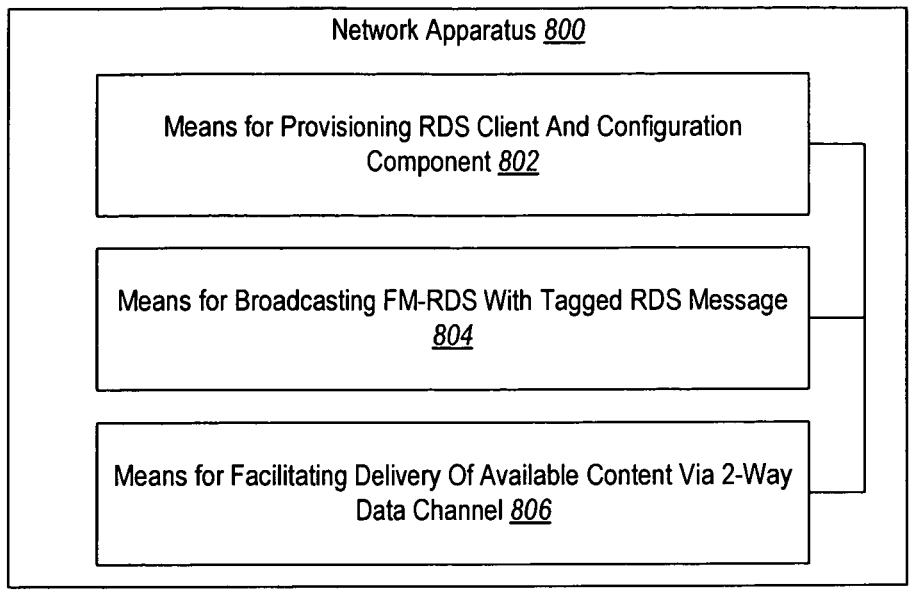
FIG. 12 illustrates a block diagram of a network apparatus containing modules for providing RDS interactive services.

In an illustrative aspect of providing for dynamic sub-messages, a "DynamicSizedInt" data type denotes a dynamic-sized integer, which is an integer such that if the first byte is between 0-127, then the value is simply the value of the first byte, but if the MSB of the first byte is high (i.e., the value of the first byte is between 128-255), then take the 7 LSBs of the first byte and concatenate them to the subsequent bytes after interpreting them as DynamicSizedInt. A "MaxFourByteDynamicSizedInt" data type is a DynamicSizedInt that is limited to four-bytes, so if the MSB of the 3rd byte is high, then the entire 4th byte is treated as the 8 LSBs of the resulting dynamic-sized int. In FIG. 12, in another aspect, a network apparatus 800 includes modules that provide means to cause a computer to provide Radio Data System (RDS) interactive services to a population of user devices by optimizing available RDS bandwidth while delivering related content via a two-way data channel. A module 802 provides means for provisioning a plurality of user devices with an RDS-IS client and a configuration component that identifies a request location accessible via a wireless communication channel provided by a wireless carrier of data packet services. A module 804 provides means for broadcasting a Frequency Modulated (FM) radio signal containing audio portion and a tagged RDS message referencing available content that can be interpreted by the RDS-IS client. A module 806 provides means for facilitating delivery of the available content requested by a selected one of the plurality of user devices via a two-way data channel via the wireless carrier.

In another aspect, in order to provide flexibility as to message size as constrained by the RDS data rate limitations, dynamically sized messages are facilitated by flagging in most significant bits (MSB) whether the parameter is present and whether the parameter is fixed or variable (dynamic length). If dynamic and carried on in sub-messages, the MSB can indicate in binary whether or not this is the end of the dynamically sized parameter. Thus, a parameter could be 7 bits or 15 bits or 32 bits or some other length. This can be applied to any field declared to be a dynamically-sized integer.

Figure 13:
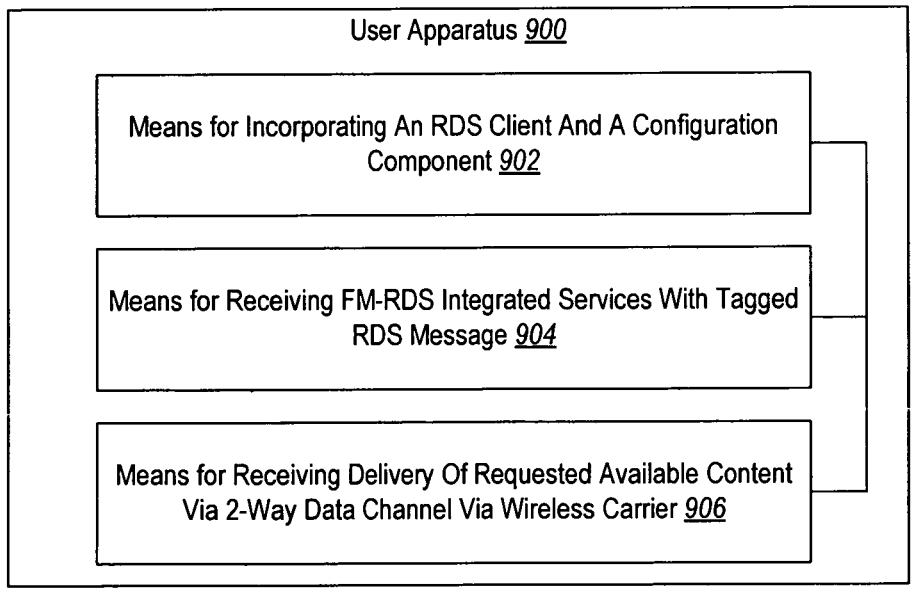
FIG. 13 illustrates a block diagram of a user apparatus containing modules for receiving RDS interactive services.

In FIG. 13, in an additional aspect, a user apparatus 900 includes modules provide means for utilizing RDS interactive services at a population of user devices by optimizing available RDS bandwidth while receiving related content via a two-way data channel. A module 902 provides means for incorporating an RDS-IS client and a configuration component that identifies a request location accessible via a wireless communication channel provided by a wireless carrier of data packet services. A module 904 provides means for receiving a Frequency Modulated (FM) radio signal containing audio portion and a tagged RDS message referencing available content that can be interpreted by the RDS-IS client. A module 906 provides means for receiving delivery of the available content requested by a selected one of the plurality of user devices via a two-way data channel via the wireless carrier.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for utilizing interactive services at a user device, comprising:
    incorporating an interactive services client and a configuration component that identifies a request location accessible via a wireless communication channel provided by a wireless carrier of data packet services;
    receiving, from at least one broadcaster, an analog radio signal comprising an audio portion and a tagged data message referencing available content that can be interpreted by the interactive services client, wherein the tagged data message at least includes an identifier associated with the at least one broadcaster, and the interactive services client determines a relationship between the at least one broadcaster and the wireless carrier based on the identifier; and
    receiving delivery of requested available content via a two-way data channel via the wireless carrier.

2. The method of claim 1, wherein the analog audio radio broadcast comprises a frequency modulated (FM) broadcast and wherein the intermittent digital data signal comprises Radio Data System (RDS) or Radio Broadcast Data System (RBDS) protocol.

3. The method of claim 1, wherein incorporating the interactive services client further comprises incorporating via a wired connection to a computer-readable storage medium.

4. The method of claim 1, wherein incorporating the interactive services client further comprises incorporating by downloading over the two-way data channel via the wireless carrier.

5. The method of claim 1, further comprising incorporating a plurality of encryption components each suitable for one of a plurality of wireless carriers of data packet services to receive RDS interactive services.

6. The method of claim 1, further comprising receiving the available content via a selected one of a group consisting of a two-way data channel comprising a mobile switching network, a wireless access network, and a personal access network.

7. The method of claim 1, further comprising interpreting a graphic association with the tagged data message and accessing a graphic for display in response to the graphic association.

8. The method of claim 1, further comprising interpreting the tagged data message as a shopping opportunity associated with currently broadcast audio portion.

9. The method of claim 1, further comprising a selected one of a group consisting of interpreting the tagged data message as an available graphical user interface (GUI) wallpaper graphic, interpreting the tagged data message as an available mobile phone ringtone, interpreting the tagged data message as an available song download, and interpreting the tagged data message with an available video download.

10. The method of claim 1, further comprising receiving the analog radio signal on one of a plurality of geographically separated broadcast stations.

11. The method of claim 10, further comprising interpreting the data message as including geographically-specific navigation data, or a geographically-specific alert data, or a news item.

12. The method of claim 1, further comprising generating a user-perceptible alert while displaying the data message.

13. The method of claim 1, further comprising selecting one of a group consisting of hot key shortcut, a send short message service (SMS) utility, a speed dial number contained in the tagged data message, a data packet communication modality supported by the user device, and graphical user interface (GUI) icon selection navigation.

14. The method of claim 1, further comprising automatically accessing advertising content via the two-way data channel in response to interpreting the tagged data message.

15. The method of claim 1, further comprising displaying application content locally accessed in response to a user selection of a displayed portion of the tagged data message.

16. The method of claim 15, further comprising displaying a selected one of a group consisting of a voting application content, a rating application content, and a contest application content.

17. The method of claim 1, further comprising selecting a level of interactive services, wherein a displayed prompt communicates the selected level of interactive services.

18. The method of claim 17, further comprising responding to user device constraints to select a level of interactive services.

19. The method of claim 17, further comprising responding to a carrier subscription for two-way data packet services to select a level of interactive services.

20. The method of claim 17, further comprising responding to user selections to select a level of RDS interactive services.

21. The method of claim 17, further comprising dynamically selecting a level of interactive services responsive to user settings, two-way data channel available throughput, and user device constraints.

22. The method of claim 17, further comprising selecting a level of interactive services based in part upon a priority setting.

23. The method of claim 1, further comprising requesting content by identifying a time stamp and a broadcast station in order to identify content associated with tagged data message.

24. The method of claim 23, further comprising retaining and displaying in response to user input a plurality of data messages.

25. At least one processor for utilizing interactive services at a user device, comprising:
a first module for incorporating an interactive services client and a configuration component that identifies a request location accessible via a wireless communication channel provided by a wireless carrier of data packet services;
a second module for receiving, from at least one broadcaster, an analog radio signal containing audio portion and a tagged data message referencing available content that can be interpreted by the interactive services client, wherein the tagged data message at least includes an identifier associated with the at least one broadcaster, and the interactive services client determines a relationship between the at least one broadcaster and the wireless carrier based on the identifier; and
a third module for receiving delivery of requested available content via a two-way data channel via the wireless carrier.

26. A computer program product for utilizing interactive services at a user device, comprising:
a computer-readable storage medium comprising:
a first set of codes for causing a computer to incorporate an interactive services client and a configuration component that identifies a request location accessible via a wireless communication channel provided by a wireless carrier of data packet services;
a second set of codes for causing the computer to receive, from at least one broadcaster, an analog radio signal containing audio portion and a tagged data message referencing available content that can be interpreted by the interactive services client, wherein the tagged data message at least includes an identifier associated with the at least one broadcaster, and the interactive services client determines a relationship between the at least one broadcaster and the wireless carrier based on the identifier; and
a third set of codes for causing the computer to receive delivery of requested available content via a two-way data channel via the wireless carrier.

27. An apparatus for utilizing interactive services, comprising:
means for incorporating an interactive services client and a configuration component that identifies a request location accessible via a wireless communication channel provided by a wireless carrier of data packet services;
means for receiving, from at least one broadcaster, an analog radio signal containing audio portion and a tagged data message referencing available content that can be interpreted by the interactive services client, wherein the tagged data message at least includes an identifier associated with the at least one broadcaster, and the interactive services client determines a relationship between the at least one broadcaster and the wireless carrier based on the identifier; and means for receiving delivery of requested available content via a two-way data channel via the wireless carrier.

28. A user apparatus for utilizing interactive services, comprising:

an interactive services client;

a configuration component that identifies a request location accessible via a wireless communication channel provided by a wireless carrier of data packet services;

an analog receiver for receiving, from at least one broadcaster, an analog radio signal containing audio portion and a tagged data message referencing available content that can be interpreted by the interactive services client, wherein the tagged data message at least includes an identifier associated with the at least one broadcaster, and the interactive services client determines a relationship between the at least one broadcaster and the wireless carrier based on the identifier; and a wireless transceiver for receiving delivery of the available content requested by a selected one of the plurality of user devices via a two-way data channel via the wireless carrier.

29. The user apparatus of claim 28, wherein the analog audio radio broadcast comprises a frequency modulated (FM) broadcast and wherein the intermittent digital data signal comprises Radio Data System (RDS) or Radio Broadcast Data System (RBDS) protocol.

30. The user apparatus of claim 28, wherein the interactive services client is incorporated by a wired connection to a computer-readable storage medium.

31. The user apparatus of claim 28, wherein the interactive services client is incorporated by downloading over the two-way data channel via the wireless carrier.

32. The user apparatus of claim 28, further comprising a plurality of encryption components each suitable for one of a plurality of wireless carriers of data packet services to receive RDS interactive services.

33. The user apparatus of claim 28, wherein the wireless transceiver is further configured for receiving the available content via a mobile switching network.

34. The user apparatus of claim 28, wherein the wireless transceiver is further configured for receiving the available content via a wireless access network.

35. The user apparatus of claim 28, wherein the wireless transceiver is further configured for receiving the available content via a personal access network.

36. The user apparatus of claim 28, wherein the interactive services client is further configured for interpreting a graphic association with the tagged data message and for accessing a graphic for display in response to the graphic association.

37. The user apparatus of claim 28, wherein the interactive services client is further configured for interpreting the tagged data message as a shopping opportunity associated with currently broadcast audio portion.

38. The user apparatus of claim 37, wherein the interactive services client is further configured for interpreting the tagged data message as a selecting one of a group consisting of an available graphical user interface (GUI) wallpaper graphic, an available mobile phone ringtone, an available song download, and an available video download.

39. The user apparatus of claim 28, wherein the analog receiver is further configured for receiving the analog radio signal broadcast by one of a plurality of geographically separated broadcast stations.

40. The user apparatus of claim 39, wherein the data message comprises at least one of geographically-specific navigation data, or geographically-specific alert data, or a news item.

41. The user apparatus of claim 28, wherein the interactive services client is further configured for generating a user-perceptible alert while displaying the data message.

42. The user apparatus of claim 28, wherein the interactive services client is further configured for selecting one of a group consisting of a hot key shortcut, a send short message service (SMS) utility, a speed dial number contained in the tagged data message, a data packet communication modality supported by the user device, and a graphical user interface (GUI) icon selection navigation.

43. The user apparatus of claim 28, wherein the interactive services client is further configured for automatically accessing advertising content via the two-way data channel in response to interpreting the tagged data message.

44. The user apparatus of claim 28, wherein the interactive services client is further configured for displaying application content locally accessed in response to user selection of a displayed portion of the tagged data message.

45. The user apparatus of claim 44, wherein the interactive services client is further configured for displaying a selected one of a group consisting of a voting application content, a rating application content, and a contest application content.

46. The user apparatus of claim 28, wherein the interactive services client is further configured for selecting a level of interactive services, wherein a displayed prompt communicates the selected level of interactive services.

47. The user apparatus of claim 46, wherein the interactive services client is further configured for responding to user device constraints to select a level of interactive services.

48. The user apparatus of claim 46, wherein the interactive services client is further configured for responding to a carrier subscription for two-way data packet services to select a level of interactive services.

49. The user apparatus of claim 46, wherein the interactive services client is further configured for responding to user selections to select a level of interactive services.

50. The user apparatus of claim 46, wherein the interactive services client is further configured for dynamically selecting a level of interactive services responsive to user settings, two-way data channel available throughput, and user device constraints.

51. The user apparatus of claim 46, wherein the interactive services client is further configured for selecting the level of interactive services based in part upon a priority setting.

52. The user apparatus of claim 28, wherein the interactive services client is further configured for requesting content by identifying a time stamp and a broadcast station in order to identify content associated with tagged data message.

53. The user apparatus of claim 52, wherein the interactive services client is further configured for retaining and displaying, in response to user input, a plurality of data messages.

54. A method for providing interactive services, comprising:

provisioning a user device with an interactive services client and a configuration component that identifies a request location accessible via a wireless communication channel provided by a wireless carrier of data packet services;

broadcasting, from at least one broadcaster, an analog radio signal containing audio portion and a tagged data message referencing available content that can be interpreted by the interactive services client, wherein the tagged data message is configured to at least include an identifier associated with the at least one broadcaster, and the identifier identifies a relationship between the at least one broadcaster and the wireless carrier; and facilitating delivery of the available content requested by the user device via a two-way data channel via the wireless carrier.

55. The method of claim 54, wherein the interactive services client and the configuration component are suitable for one of a plurality of wireless carriers of data packet services.

56. At least one processor for providing interactive services, comprising:
  a first module for provisioning a user device with an interactive services client and a configuration component that identifies a request location accessible via a wireless communication channel provided by a wireless carrier of data packet services;
  a second module for broadcasting, from at least one broadcaster, an analog radio signal containing audio portion and a tagged data message referencing available content that can be interpreted by the interactive services client, wherein the tagged data message is configured to at least include an identifier associated with the at least one broadcaster, and the identifier identifies a relationship between the at least one broadcaster and the wireless carrier; and
  a third module for facilitating delivery of the available content requested by the user device via a two-way data channel via the wireless carrier.

57. A computer program product for providing interactive services, comprising:
  a computer-readable storage medium comprising,
    a first set of codes for causing a computer to provision a user device with an interactive services client and a configuration component that identifies a request location accessible via a wireless communication channel provided by a wireless carrier of data packet services;
    a second set of codes for causing the computer to broadcast, from at least one broadcaster, an analog radio signal containing audio portion and a tagged data message referencing available content that can be interpreted by the interactive services client, wherein the tagged data message is configured to at least include an identifier associated with the at least one broadcaster, and the identifier identifies a relationship between the at least one broadcaster and the wireless carrier; and
    a third set of codes for causing the computer to facilitate delivery of the available content requested by the user device via a two-way data channel via the wireless carrier.

58. An apparatus for providing interactive services to a population of user devices, comprising:
  means for provisioning a user device with an interactive services client and a configuration component that identifies a request location accessible via a wireless communication channel provided by a wireless carrier of data packet services;
  means for broadcasting, from at least one broadcaster, an analog radio signal containing audio portion and a tagged data message referencing available content that can be interpreted by the interactive services client, wherein the tagged data message is configured to at least include an identifier associated with the at least one broadcaster, and the identifier identifies a relationship between the at least one broadcaster and the wireless carrier; and
  means for facilitating delivery of the available content requested by the user device via a two-way data channel via the wireless carrier.

59. A network apparatus for providing interactive services, comprising:
  a distribution component for provisioning a user device with an interactive services client and a configuration component that identifies a request location accessible via a wireless communication channel provided by a wireless carrier of data packet services;
  an analog radio broadcaster for broadcasting, from at least one broadcaster, an analog radio signal containing audio portion and a tagged data message referencing available content that can be interpreted by the interactive services client, wherein the tagged data message is configured to at least include an identifier associated with the at least one broadcaster, and the identifier identifies a relationship between the at least one broadcaster and the wireless carrier; and
  a data packet network for facilitating delivery of the available content requested by the user device via a two-way data channel via the wireless carrier.

60. The network apparatus of claim 59, wherein the interactive services client and the configuration component are suitable for one of a plurality of wireless carriers of data packet services.

* * * * *